(12) United States Patent
Hirth et al.

(10) Patent No.: US 8,107,799 B2
(45) Date of Patent: Jan. 31, 2012

(54) EVAPORATOR DEVICE FOR MOBILE ANHYDROUS AMMONIA PRODUCTION, MOTOR VEHICLE AND METHOD FOR PRODUCING SUCH AN EVAPORATOR DEVICE

(75) Inventors: Peter Hirth, Rösrath (DE); Marc Brugger, Neunkirchen (DE); Thomas Härig, Neunkirchen-Seelscheid (DE); Rolf Brück, Bergisch Gladbach (DE); Christian Vorsmann, Köln (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 12/618,801

(22) Filed: Nov. 16, 2009

(65) Prior Publication Data
US 2010/0092162 A1   Apr. 15, 2010

Related U.S. Application Data

(63) Continuation of application No. PCT/EP2008/055293, filed on Apr. 30, 2008.

(30) Foreign Application Priority Data

May 16, 2007   (DE) .......................... 10 2007 023 424
Dec. 4, 2007    (DE) .......................... 10 2007 058 486

(51) Int. Cl.
*F22B 29/06*   (2006.01)

(52) U.S. Cl. .......................... 392/397; 392/386; 29/527.5
(58) Field of Classification Search ........................ None
See application file for complete search history.

(56) References Cited

U.S. PATENT DOCUMENTS

| | | |
|---|---|---|
| 2003/0188855 A1 | 10/2003 | Maeda et al. |
| 2004/0148859 A1 | 8/2004 | Kawamura et al. |
| 2006/0277827 A1 | 12/2006 | Yamamoto |
| 2007/0163245 A1* | 7/2007 | Sheridan et al. ............... 60/286 |
| 2008/0230184 A1 | 9/2008 | Eigenberger et al. |
| 2009/0120078 A1 | 5/2009 | Bruck et al. |

FOREIGN PATENT DOCUMENTS

| | | |
|---|---|---|
| DE | 102005023956 A1 | 11/2006 |
| DE | 102006023148 A1 | 11/2007 |
| WO | 2006132132 A1 | 12/2006 |

OTHER PUBLICATIONS

International Search Report dated Oct. 24, 2008.

* cited by examiner

*Primary Examiner* — Thor Campbell
(74) *Attorney, Agent, or Firm* — Laurence A. Greenberg; Werner H. Stemer; Ralph E. Locher

(57) ABSTRACT

An evaporator device for ammonia to be used in mobile exhaust gas systems includes a basic body encompassing at least one inlet line and at least one outlet line. At least one heating element and at least one duct for connecting the inlet line to the outlet line are disposed within the basic body. The at least one heating element is in heat-conducting contact with an evaporation section of the at least one duct, while the at least one duct has a meandering course in the evaporation section. A motor vehicle and a method for producing an evaporator device, are also provided.

17 Claims, 5 Drawing Sheets

EVAPORATOR DEVICE FOR MOBILE ANHYDROUS AMMONIA PRODUCTION, MOTOR VEHICLE AND METHOD FOR PRODUCING SUCH AN EVAPORATOR DEVICE

CROSS-REFERENCE TO RELATED APPLICATION

This is a continuation, under 35 U.S.C. §120, of copending International Application No. PCT/EP2008/055293, filed Apr. 30, 2008, which designated the United States; this application also claims the priority, under 35 U.S.C. §119, of German Patent Applications DE 10 2007 023 424.6, filed May 16, 2007, and DE 10 2007 058 486.7, filed Dec. 4, 2007; the prior applications are herewith incorporated by reference in their entirety.

BACKGROUND OF THE INVENTION

Field of the Invention

The present invention relates to an evaporator device including a basic body with at least one inlet line and at least one outlet line, at least one heating element in the basic body and at least one duct in the basic body for connecting the inlet line to the outlet line. The invention also relates to a motor vehicle and a method for producing an evaporator device. Such an evaporator device is intended for use, in particular, for heating or superheating an aqueous urea solution in order to thereby ultimately produce ammonia gas, which can be metered to an exhaust system of a motor vehicle in order to convert pollutants of the exhaust gas.

In diesel internal combustion engines, in particular, it has proven to be expedient to directly meter urea in aqueous solution, or ammonia after an external hydrolysis, to the exhaust gas produced by the internal combustion engine. In that case, in known methods, use is made of a hydrolysis catalytic converter in which ammonia is obtained from the urea. The aqueous urea solution is metered-in upstream of the hydrolysis catalytic converter, is changed into the gaseous state and is brought into contact with the hydrolysis catalytic converter. The ammonia, which is generated in that way, then reacts, for example with a so-called SCR catalytic converter further downstream in the exhaust-gas flow, with the nitrogen oxides contained therein to form molecular nitrogen and water.

Temperature control is particularly difficult during the evaporation of the aqueous urea solution. That must be taken into consideration specifically from the aspect that firstly the required quantities of the urea solution and secondly the available temperatures can vary significantly during a mobile application. If only incomplete evaporation is obtained, intermediate products may form, which can possibly lead to the evaporator unit becoming blocked. Such undesired by-products are, for example, water-insoluble biuret, which is formed from isocyanic acid and urea, and cyanuric acid, which is the trimerization product of the isocyanic acids.

SUMMARY OF THE INVENTION

It is accordingly an object of the invention to provide an evaporator device for mobile anhydrous ammonia production, a motor vehicle and a method for producing such an evaporator device, which overcome the hereinafore-mentioned disadvantages and at least partially solve the problems of the heretofore-known devices and methods of this general type and in which the evaporator device has a compact construction and ensures the delivery or production of ammonia gas with a predefined level of accuracy and completeness even under highly dynamic temperature load shifts.

With the foregoing and other objects in view there is provided, in accordance with the invention, an evaporator device, comprising a basic body with at least one inlet line and at least one outlet line, at least one duct disposed in the basic body for connecting the inlet line to the outlet line, the at least one duct having an evaporation section and a meandering course in the evaporation section, and at least one heating element disposed in the basic body in heat-conducting contact with the evaporation section.

The basic body is, in particular, a solid component (for example, wall regions are considerably thicker than the duct cross section), while the inlet line and/or the outlet line is/are preferably a dimensionally stable, pipe-like separate component. In this respect it is, for example, possible for an inlet line to be fixed to the basic body along a common longitudinal axis through a port. The duct is then formed in the basic body, with the outlet line likewise being fixed to a port on the opposite side of the basic body.

The duct now extends through the basic body. In order to energetically and particularly expediently introduce thermal energy to be introduced for evaporation, at least one heating element is positioned in or on the basic body (a plurality of heating elements integrated in the basic body in a uniformly distributed manner is preferable) in such a way that the heat generated in this way can be introduced onto the duct wall at least in the so-called evaporation section in this case.

It is also proposed herein that the (preferably only) one duct has a meandering shape, in the evaporation section. This means in particular that the duct, in the evaporation section, does not extend rectilinearly (for example along the longitudinal axis) but rather preferably has a plurality of loops, kinks, turns or the like. It has been found that precisely such a meandering shape results in two positive effects: firstly, it is thus possible for a large duct length to be formed over a relatively small extent of the basic body, in such a way that an adequate evaporation path can be realized with a very compact construction of the basic body. Secondly, it has been found that the forced changes in direction for the fluid flowing through the duct result in faster and more complete evaporation. It is thus possible, for example with delivery rates through the duct in the range of up to 125 millimeters per minute, to obtain evaporation efficiencies of considerably higher than 95%, in particular above 98%, and to thereby obtain a surprisingly significant improvement in relation to a similar straight duct path.

In accordance with another feature of the evaporator device of the invention, at least the evaporation section of the at least one duct at least partially includes at least one pipe. A pipe is to be understood in particular to mean an elongate hollow body having a length which is significantly greater than its cross section. The cross section may have any desired shape, with a round cross section being preferable due to the good ratio between circumference and cross-sectional area, since that ratio permits a good introduction of heat. The at least one pipe preferably has a wall thickness of 0.1 to 0.5 mm (millimeters), since this permits a good cohesive connection to the basic body. In particular, this enables the pipe to be cast integrally into the basic body, since the wall thickness is firstly large enough to prevent the pipe from melting through as it is cast integrally but to allow the outer layer of the pipe to fuse. Secondly, the wall thickness is small enough to still enable a good transfer of heat.

In accordance with a further feature of the evaporator device of the invention, the pipe is cohesively connected to the basic body. It is particularly advantageous in this case for the at least one pipe to be cast integrally (or encapsulated) into or with the basic body. As a result of the integral casting or encapsulation, secure cohesive contact is obtained between the basic body and the pipe and therefore the evaporation section, without gaps forming between the basic body and the evaporation section. Good thermal contact and therefore a good transfer of heat are therefore possible, such that effective evaporation can take place in the evaporation section. The basic body can preferably also be formed by the casting material itself used for the encapsulation.

In accordance with an added feature of the evaporator device of the invention, the pipe is formed from a material including at least one of the following substances:
a) steel and/or
b) aluminum and/or
c) titanium.

In particular, when the encapsulation of the at least one pipe is carried out by using a substance including aluminum, in particular by using aluminum, materials which have melting points that lie above the melting point of aluminum include steel, preferably high-temperature-resistant and corrosion-resistant steel, and titanium. An alloy which is based on or includes aluminum and which has a higher melting point than aluminum can also advantageously be used.

In accordance with an additional feature of the evaporator device of the invention, the at least one duct has, in the evaporation section, at least one of the following features:
5.1 a plurality of alternating straight shape regions and curved shape regions,
5.2 curved shape regions having an extension of a duct cross section,
5.3 a duct section length of 300 to 1000 mm [millimeters],
5.4 a mean duct cross section of 0.2 to 10 mm$^2$,
5.5 differently curved shape regions,
5.6 a plurality of curved shape regions with a curvature of at least 90°,
5.7 a configuration in an evaporator plane of the basic body,
5.8 a duct wall including aluminum,
5.9 a duct wall including titanium,
5.10 a duct wall with a mean roughness depth $R_z$ in a range of from 2 μm [micrometers] to 50 μm,
5.11 a hygroscopically active duct wall, and/or
5.12 a constriction of a duct cross section.

With regard to the features specified above, it is preferable for the duct to have, in the evaporation section, at least five and preferably even at least eight of the features, in particular a combination of features 5.1, 5.2, 5.3, 5.4, 5.7, 5.8, 5.10, 5.11.

Feature 5.1 is to be understood in particular to mean that the duct repeatedly has straight shape regions, in particular running parallel to one another, between which one curved shape region is provided in each case. Specifically in the case of a parallel alignment of the straight shape regions, the curved shape region is formed, for example, in the manner of a 180° turn, or a double 90° turn (if appropriate with an interposed, relatively short straight shape region).

With regard to feature 5.2, it should be noted that an extension of the duct cross section by at least 30%, in particular at least 40%, is obtained in the curved shape region. In this case, the extension is preferably provided in the manner of an outwardly bulged portion in the region of the outer side of the curved shape region in relation to the flow. It is also possible for the extension to form a continuation of the preceding straight shape region beyond the curved shape region. Such an extension likewise forms a flow reservoir for a turbulent flow and thereby leads to particularly intimate contact with the hot duct wall in that region.

Features 5.3 and 5.4 illustrate how small a heat-exchanging area (duct section length×mean duct circumference) is required in this case for the introduction of the energy required for complete evaporation. It is preferable in this case for the duct to form, in the evaporation section, at least ten (10), preferably at least twenty (20) curved shape regions over the specified duct section length.

Feature 5.5 relates, for example, to an embodiment variant in which no straight shape regions which are disposed parallel to one another are formed, but rather in which differently curved shape regions are provided, if appropriate with the omission of the straight shape regions. The differently curved shape regions differ, for example, by different radii of curvature.

In order to routinely obtain a compact configuration and simultaneously good flow characteristics, it is proposed that a plurality of curved shape regions with a curvature of at least 90° [degrees] be provided (see feature 5.6). In this case, it is also preferable for the curvature to be situated, like the entire duct, in a common evaporator plane of the basic body (see feature 5.7). This has the advantage that a duct of this type can be produced in a relatively simple manner, wherein a uniform introduction of temperature into the common evaporator plane is also made possible.

With regard to the material, it is proposed in feature 5.8 that the duct wall be formed with aluminum—if appropriate also with an insert (which is integrated into the basic body and at least partially forms the duct wall). It is very particularly preferable for the material constituents of the duct wall (which is in contact with the fluid) to include at least inter alia a mass proportion of over 50%, in particular 90%, aluminum and/or aluminum compounds. Aluminum has particularly positive properties with regard to heat transfer, and may even exhibit hydrolytic activity with the formation of aluminum oxide. With regard to a particularly good thermal conductivity, it is also proposed that the surface roughness of the duct wall lie in the range of 2 μm to 50 μm, in particular in a range between 5 and 20 μm. In order to provide a hydrolytically active duct wall, it is possible, if appropriate, to provide (additional) coatings, with the formation of metallic oxides, for example of aluminum, titanium and/or vanadium, being particularly preferable. It is also advantageously possible for the duct wall to be formed with titanium (feature 5.9). Titanium has a high melting temperature and furthermore, oxides of titanium are hydrolytically active.

In accordance with again another feature of the evaporator device of the invention, the at least one duct forms, between the at least one inlet line and the evaporation section, an inflow section which is disposed offset with respect to the evaporation section. In this context, "offset" encompasses in particular a position in which the inflow section is thermally influenced to a relatively minor extent by at least one heating element or a relatively low number of heating elements. The at least one heating element may, for example, also extend into the vicinity of the inflow section, but with the effect on that duct section then preferably being reduced.

In accordance with again a further feature of the evaporator device of the invention, with regard to the explanations given above, it is preferable for the at least one duct to have, in the inflow section, at least one of the following features:
7.1 a position offset with respect to an evaporator plane of the basic body,
7.2 a mean duct cross section of 0.2 to 30 mm$^2$ [square millimeters],
7.3 a cooling device,
7.4 a galvanic deposition.

Considering the preferred construction of the evaporator device, in which the duct is disposed in a common evaporator plane in the evaporation section, it is thus proposed herein that the inflow section be guided up to the evaporation section outside that plane. If the evaporator plane extends, for example, over a longitudinal axis of the basic body, then the inflow section may be positioned parallel to the longitudinal axis outside the evaporator plane. It is preferable, since it is predominantly furthermore a liquid which is to be guided in this case, to provide a slightly smaller mean duct cross section in this case. It is possible in this case for the inflow section to be formed, for example, as a single bore, in such a way that the inflow section is of at least predominantly rectilinear construction.

It is also proposed that the inflow section be formed with a cooling device. Such a cooling device may be provided in order to limit the temperature in the inflow section even during different operation of the heating elements. It is thus possible, if appropriate, to provide Peltier elements which can be activated in a targeted fashion and which dissipate heat from the inflow section as required.

Furthermore, it is also considered to be advantageous to provide a galvanic deposition between the inlet line and the inflow section. It is thereby possible, specifically with a simultaneous provision of a galvanic deposition in the region of the outflow section, to obtain electrical decoupling of the basic body with respect to adjoining components. This may be advantageous specifically if a part of the basic body is heated directly by electrical current (ohmic resistance heating).

In accordance with again an added feature or structural variant of the evaporator device of the invention, the at least one duct forms, between the evaporation section and the at least one outlet line, an outflow section which includes a widening of the duct cross section. In this case, the widening is constructed in such a way that preferably a multiple, for example at least 4 times or even at least 10 times, of the preceding mean duct cross section is provided in this case. This ensures a further expansion of the fluid which, by this stage, is gaseous.

In accordance with again an additional feature of the evaporator device of the invention, in this connection, it is preferable for the at least one duct to have, in the outflow section, at least one of the following features:
 9.1 at least one hydrolytically active reactor chamber,
 9.2 at least one honeycomb body which, with sheet-metal foils including aluminum, forms a plurality of flow paths,
 9.3 a widening in the form of a cone between the evaporation section and a hydrolytically active reactor chamber, and/or
 9.4 a thermal insulation with respect to the at least one heating element.

The hydrolytically active reactor chamber preferably has a coating which effects a catalytically assisted hydrolysis. For this purpose, consideration is given, for example, to aluminum oxide, titanium oxide, vanadium oxide and/or tungsten oxide or a mixture of at least two of the above-stated catalysts.

In order to ensure the most intimate possible contact between the gas and a hydrolytically active coating, it is also proposed that (at least) one so-called honeycomb body be provided in the reactor chamber. The honeycomb body is, for example, formed with smooth and corrugated sheet-metal foils which are disposed so as to form a plurality of flow paths or micro-ducts. The flow paths may also have turbulence regions. If appropriate, a plurality of openings is also provided, which openings ensure an exchange of flow between the individual flow paths. The sheet-metal foils may fundamentally also be formed with steel foils, but are preferably formed (at least over the predominant part of the surface) with aluminum. It is additionally possible for a correspondingly hydrolytically active coating to be provided, for example also in the form of aluminum oxide. In particular, in the case of a honeycomb body being disposed in the reactor chamber, a widening in the form of a cone is suitable for distributing the inflowing gas uniformly over the cross section of the honeycomb body, in such a way that all of the flow paths are utilized equally for catalytic conversion. Thermal insulation should be provided at least partially, but preferably completely, around the reactor chamber, in such a way that it is possible to set the temperature in the reactor chamber, if appropriate, in a targeted fashion.

In accordance with still another feature of the evaporator device of the invention, it is also considered to be advantageous for the basic body to have at least one of the following features:
 10.1 formed with aluminum as a material,
 10.2 a two-part construction with a central evaporator plane,
 10.3 at least the evaporation section of the at least one duct being formed in a parting surface of the basic body,
 10.4 the inflow section of the at least one duct being formed into only a first part of a two-part basic body, and/or
 10.5 a multiplicity of receptacles for at least one heating element in each case.

With regard to the advantageous heat-conducting properties, it is proposed in this case that the basic body be produced at least predominantly from aluminum (with a mass proportion, for example, greater than 95%). It is preferable for the basic body to be formed in the manner of a massive or solid cylinder, with a central partition along the longitudinal axis, for example, resulting in a parting surface being formed between two substantially equal-sized parts of the basic body. The parting surface may now be utilized, for example, to form the meandering shape of the duct through the use of a surface-removal process. Milling processes, grinding processes, etching processes or similar processes are, for example, suitable for this purpose.

In the transition region between the inflow section and the evaporation section, it is then possible, proceeding from the parting surface, to provide a bore radially with respect to the longitudinal axis, which bore thereby forms an offset in the direction of the inflow section. The inflow section is then formed, parallel to the longitudinal axis and the parting surface, in only a first part of the two-part basic body. It is very particularly preferable for only one duct to be provided for guiding the flow of the fluid.

A plurality of receptacles for receiving at least one heating element in each case may now be provided around the duct, in particular at an equal spacing from the longitudinal axis. The receptacles, which in particular have cavities, are accessible at least from one side, in such a way that, for example, the heating elements can be pushed in. It is fundamentally possible, for example, to provide a separate heating element in each receptacle for each section (inflow section, evaporation section, outflow section), in such a way that the individual sections can be controlled independently of one another with regard to the desired temperature. For reasons of simple construction, and the temperature gradients which, in part, are generated automatically as a result of the measures proposed herein, it may however also be adequate to provide, in each receptacle, only one heating element which extends over all of the sections of the duct, or at least over the inflow section and the evaporation section.

In accordance with still a further feature of the evaporator device of the invention, the at least one inlet line is connected to a pump and has an inflexible line cross section. The pump enables, for example, delivery of the fluid with a pressure of up to a maximum of 6 bar, wherein a pressure of at least 2 bar should generally be maintained in operation. If appropriate, it is possible to provide a pump which can deliver in two directions, in such a way that, through the use of the single pump, fluid can on one hand be transported to the evaporator device, although it is on the other hand also possible for the inlet line to be freed from fluid again—in particular if no further evaporation is necessary. For the most precise possible dosing, it is also proposed that the line cross section of the inlet line be made inflexible, that is to say in particular that an expansion of the diameter by at most 0.25% be permitted at operating pressure.

In accordance with still an added feature of the evaporator device of the invention, the at least one outlet line can be connected to an exhaust-gas line and has a perforated end region. This means, in particular, that the outlet line has an end region which is provided with a plurality of openings through which the gas can emerge even laterally with respect to the outlet line. The perforated end region may now project into an exhaust-gas line, with a uniform distribution of the ammonia-containing gas over the cross section of the exhaust-gas line being realized.

With the objects of the invention in view, there is also provided a motor vehicle, comprising at least one evaporator device according to the invention, a drive producing exhaust gases, at least one exhaust-gas line disposed downstream of the drive, the at least one outlet line of the evaporator device projecting into the at least one exhaust-gas line, and a reservoir and a fluid conveyor interacting with the at least one inlet line of the evaporator device. A pump is used, in particular, as a fluid conveyor.

With the objects of the invention in view, there is furthermore provided a method for producing an evaporator device. The method comprises providing a basic body having at least one inlet line and at least one outlet line, providing at least one heating element in the basic body, providing at least one duct in the basic body for connecting the at least one inlet line to the at least one outlet line, providing the at least one duct with an evaporation section in heat-conducting contact with the at least one heating element, forming at least a part of the evaporation section from at least one pipe composed of a material including at least one of the following substances: a) aluminum, b) titanium, and/or c) steel, and encapsulating the at least one pipe with a casting material.

The at least one pipe is preferably placed into a basic body and encapsulated with the latter. The method is used, in particular, for producing the evaporator device according to the invention described herein.

In accordance with another mode of the method of the invention, the material from which the at least one pipe is formed has a higher melting point than the casting material. A refinement of the method is fundamentally also possible in which the temperature of the casting material during the encapsulation process is selected in such a way that fusion of the outer regions of the at least one pipe takes place, so that an intimate cohesive connection is produced between the casting material and the material of the pipe, without the inner regions of the at least one pipe being melted.

In accordance with a further mode of the method of the invention, the casting material includes aluminum. This is to be understood to mean that use is made of aluminum or an alloy including aluminum as the casting material. A material having a thermal conductivity of greater than 200 W/(m K) (Watts per meter and Kelvin) is used, in particular, as the casting material.

In accordance with an added mode of the method of the invention, a fluid flows through the pipe as the latter is being encapsulated. In this way, it is possible to provide temperature control, in particular cooling, of the inner surface of the at least one pipe, as a result of which it is possible to prevent the pipe material from being melted over the entire thickness of the pump, and consequently to prevent the pipe from melting through.

In accordance with an additional mode of the method of the invention, the fluid includes at least one of the following substances:

A) air,
B) an inert gas,
C) oxygen (O2),
D) nitrogen (N2), and/or
E) a gas obtained from the evaporation of a liquefied gas.

In accordance with a concomitant mode of the method of the invention, at least one of the following parameters: a) the volume flow of the fluid through the pipe, and/or b) the temperature of the fluid and the composition of the fluid, is selected in such a way that the at least one pipe is reliably prevented from melting through during the encapsulation process.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in an evaporator device for mobile anhydrous ammonia production, a motor vehicle and a method for producing such an evaporator device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
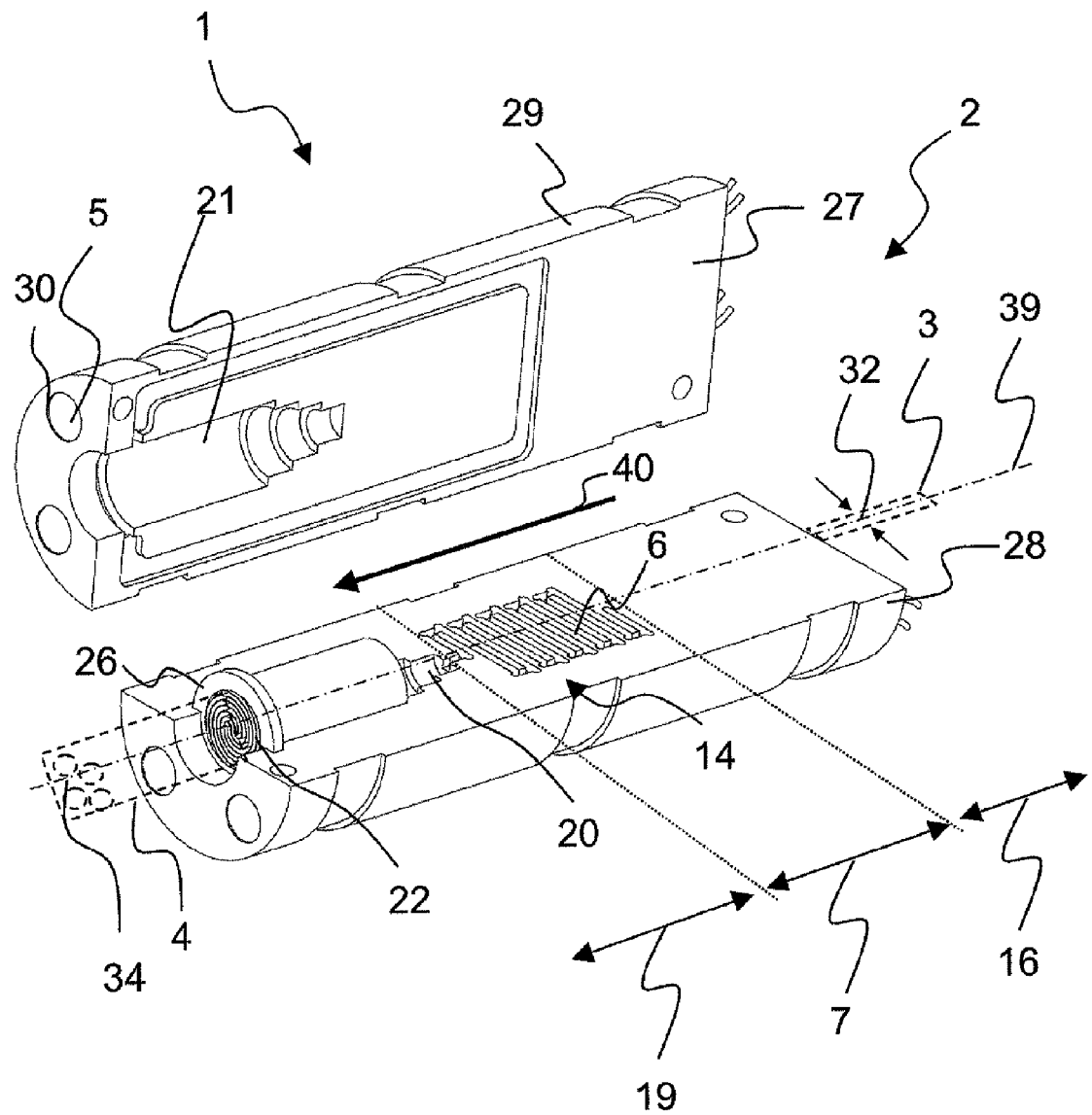
FIG. 1 is a diagrammatic, exploded, perspective view of a first structural variant of an evaporator device.

Referring now to the figures of the drawings in detail and first, particularly, to FIG. 1 thereof, there is seen a particularly preferred structural variant of an evaporator device 1, with a basic body 2 which is depicted herein in a swung-open position for illustration. Accordingly, the basic body 2 includes a first part 28 and a second part 29, which are joined together through the use of a common parting surface 27 for operation of the evaporator device 1. In this two-part construction of the basic body 2, both the first part 28 and the second part 29 each have two receptacles 30 for a respective heating element 5, which extends over the entire length of the basic body 2 in the direction of the longitudinal axis 39 thereof. Electrical connections for a heating element, formed for example with a PTC resistor (PTC: positive temperature coefficient, or so-called posistor), are shown in the right-hand region. An upper region of a reactor chamber 21 is formed in the second part 29, proceeding from the parting surface 27. Only an outflow section 19 of a duct 6 is also formed in the second part 29.

The basic body 2 or the evaporator device 1 is traversed by flow substantially along the longitudinal axis 39 in a flow direction 40. In this case, a fluid to be treated passes through an inlet line 3 with a predefined line cross section 32 into the first part 28 of the basic body 2, which is preferably produced from aluminum. A region of the duct 6 which extends over an inflow section 16 is not illustrated herein, since that region is offset with respect to the parting surface 27 in the interior of the first part 28. It is only in the region of an evaporation section 7 that the duct 6 is guided to the parting surface 27, where the duct 6 finally has a meandering shape within an evaporator plane 14. Following the evaporation section 7, the duct 6 has a widening 20 which forms a transition into the outflow section 19. The widening 20 opens out into the reactor chamber 21 in which, in this case, a honeycomb body 22 that is surrounded by thermal insulation 26 and which is in the form of a hydrolysis catalyst carrier body, is formed or positioned. An outlet line 4, which has a perforated end region 34, is illustrated as adjoining the honeycomb body 22.

Figure 2:
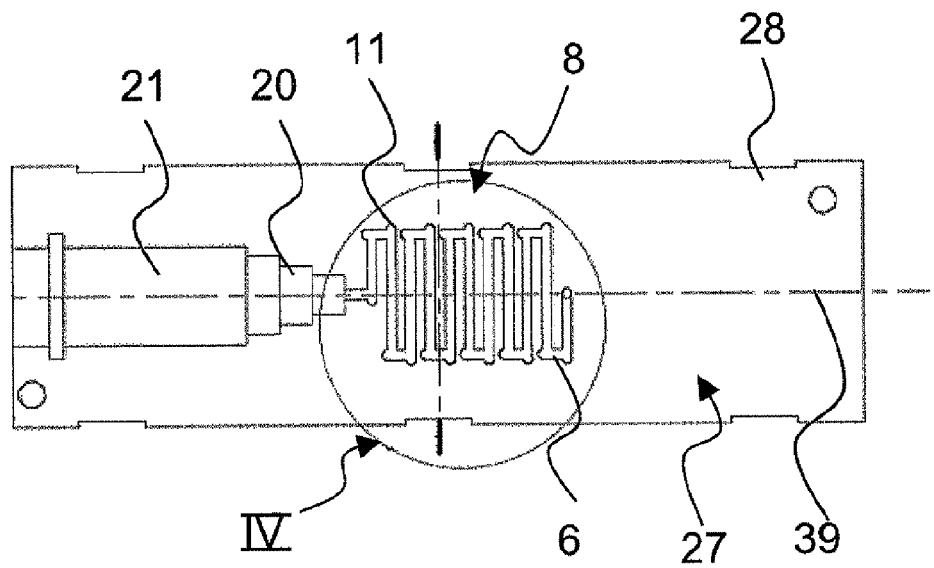
FIG. 2 is a plan view of a lower, first part of a basic body.

FIG. 2 shows a plan view of the parting surface 27 of the first part 28. The duct configuration is aligned substantially along the longitudinal axis 39, with the duct 6 first being guided to the parting surface 27 in the central region. There, the duct 6 has a meandering course or shape 8, with in each case one extension 11 being provided at individual deflections. After the duct 6 has been guided over the longitudinal axis 39 several times, for example eight or ten times, the duct 6 is guided centrally with respect to the longitudinal axis 39 again and then widens in terms of duct cross section up to the widening 20, which finally merges into the reactor chamber 21.

Figure 3:
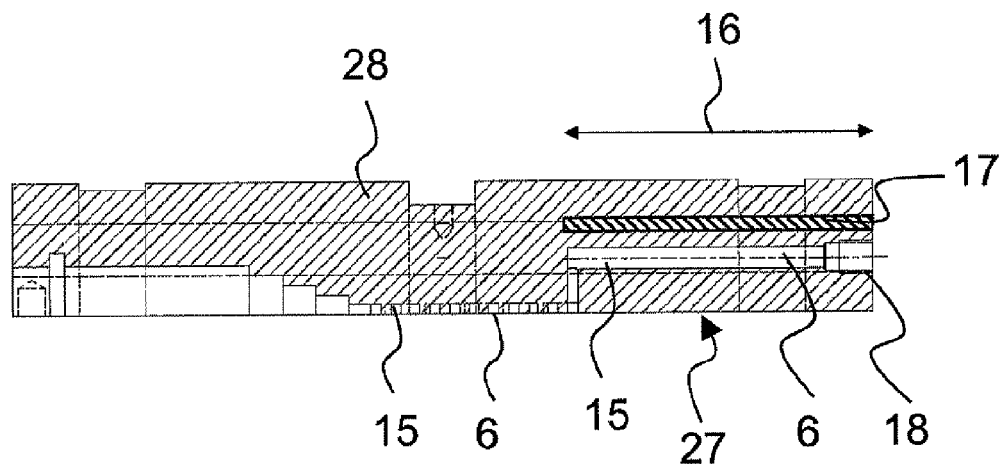
FIG. 3 is a longitudinal-sectional view of the first part of the basic body according to FIG. 2.

This is made clear once again in a longitudinal section illustrated in FIG. 3. In this case, it can also be seen that the duct 6, in the region of the inflow section 16, is formed in the manner of a bore, in such a way that a duct wall 15 is formed exclusively by the first part 28. A cooling device 17, for example in the form of a Peltier element, for setting a desired temperature level, is also provided adjacent the duct in the region of the inflow section 16. A galvanic deposition 18 is also provided in the region of the transition to the inlet line (which is not illustrated herein). Leaving the inflow section 16, the duct 6 is guided to the parting surface 27, with the duct 6 being formed, in particular milled, into the parting surface 27 there. The duct wall 15 is therefore formed by both parts of the basic body 2 in the evaporation section 7.

Figure 4:
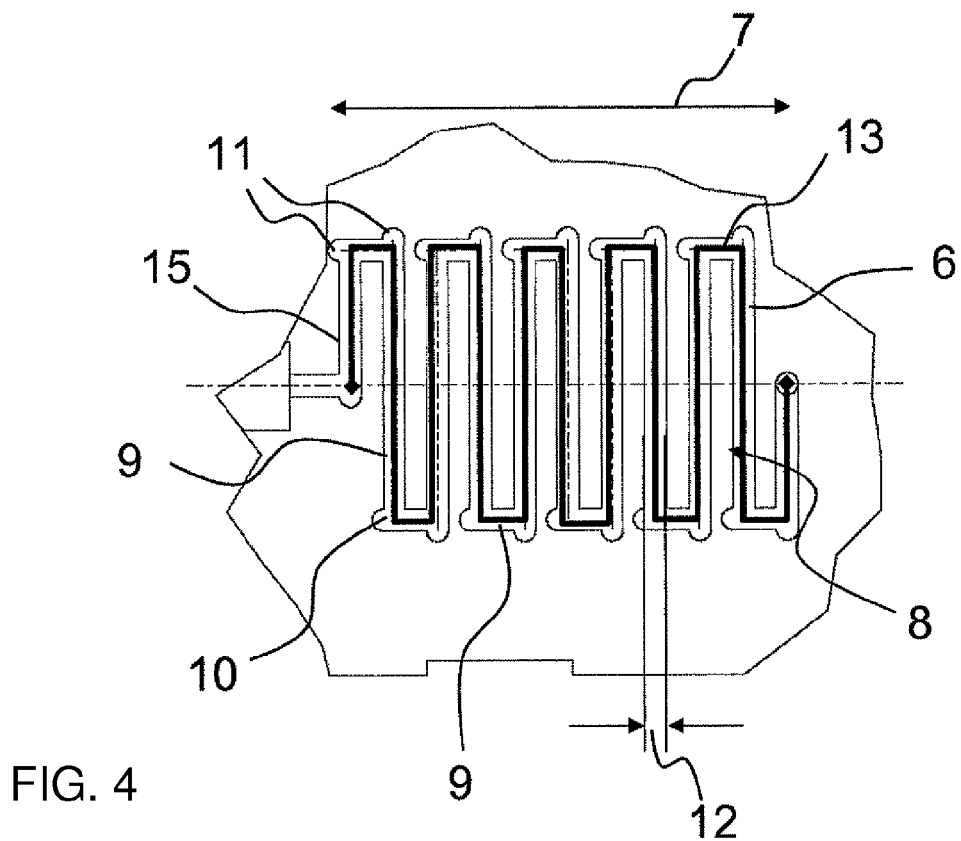
FIG. 4 is an enlarged, fragmentary view of a portion IV of FIG. 2.

FIG. 4 is a fragmentary view which shows the meandering course or shape 8 of the duct 6 in the evaporation section 7. The duct 6 has a predominantly uniform duct cross section 12. This applies in particular to straight shape regions 9 which are repeatedly interrupted by curved shape regions 10. In the curved shape regions 10, an extension 11 is provided as an elongation of the preceding straight shape region 9. This makes it possible to realize complete evaporation over a relatively short duct section length 13. Furthermore, the duct wall 15 may be provided with a predefined surface roughness, which further assists the evaporation. Part of the duct wall 15 may also be hydrolytic coatings, for example aluminum oxide.

Figure 5:
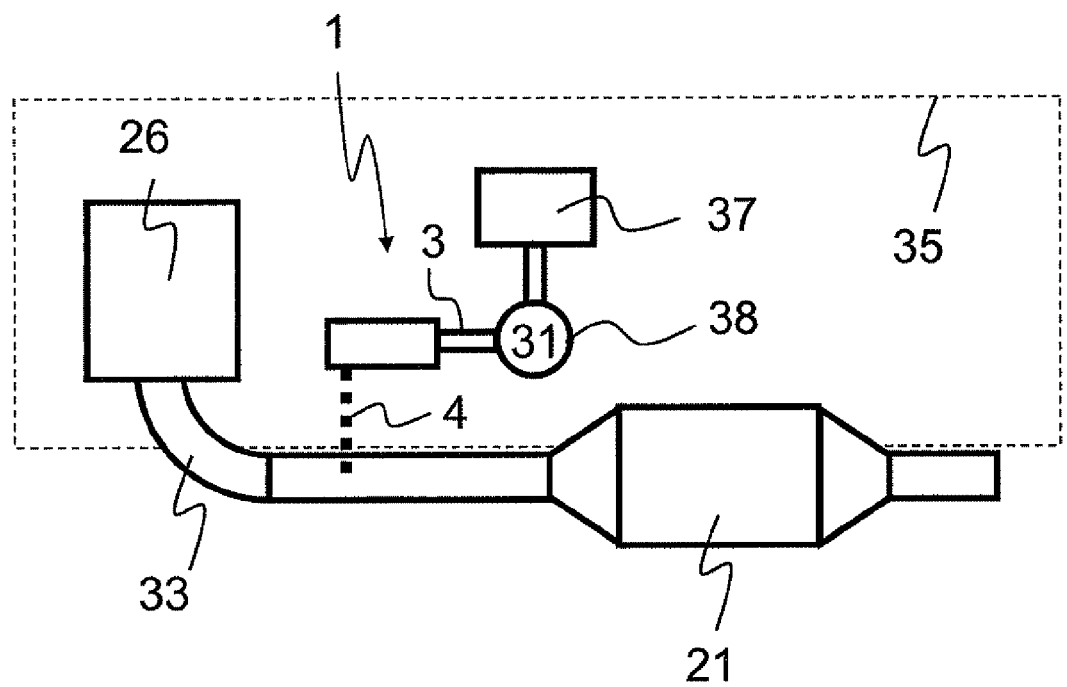
FIG. 5 is a block diagram showing a configuration of an evaporator device in a motor vehicle.

FIG. 5 schematically shows a possible application variant of the evaporator device 1. A motor vehicle 35 is provided with a drive 26, for example an internal combustion engine (in particular a diesel engine), the exhaust gas of which is conducted through an exhaust-gas line 33 to the environment. In this case, it is now proposed that, for example, aqueous urea solution be stored in a reservoir 37 and supplied to the evaporator device 1 through the inlet line 3 as required through the use of a fluid conveyor 38, for example in the form of a pump 31. After evaporation and "internal" hydrolysis, the ammonia gas is introduced into the exhaust-gas line 33 through the outlet line 4, which preferably has a perforated end region. The ammonia gas can now mix with the exhaust gas, with it also being possible for mixing elements to be provided, if appropriate. The substance mixture then impinges on a catalytic converter 21, for example a so-called SCR catalytic converter, in such a way that the nitrogen oxides can be effectively and substantially converted there.

Figure 6:
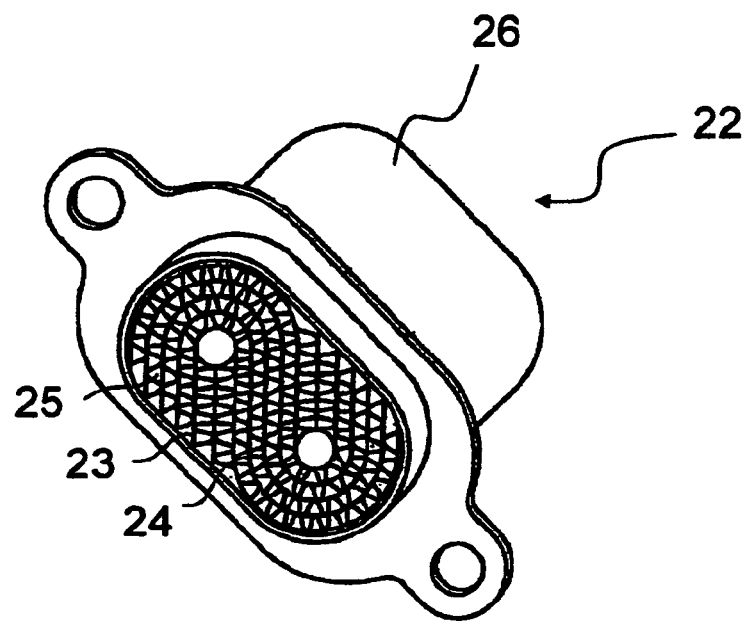
FIG. 6 is a perspective view of a structural variant of a honeycomb body.

The integration of an, in particular metallic, honeycomb body is expedient specifically if part of the evaporator device 1 is also to include a hydrolysis catalyst. Such a honeycomb body 22 is illustrated by way of example in FIG. 6. The honeycomb body 22 may be formed with a plurality of smooth sheet-metal foils 23 and structured sheet-metal foils 24, which form flow paths 25 through which the fluid to be treated can flow. The hydrolysis catalyst may then be positioned in the flow paths 25, for example in the form of a surface coating. In this case, it is firstly possible to provide a separate coating, although it is also possible, for example if the sheet-metal foils include a substantial proportion of aluminum, for oxide generated by the aluminum itself to be used for the conversion or hydrolysis. The honeycomb body 22 may also be surrounded by thermal insulation 26.

Figure 7:
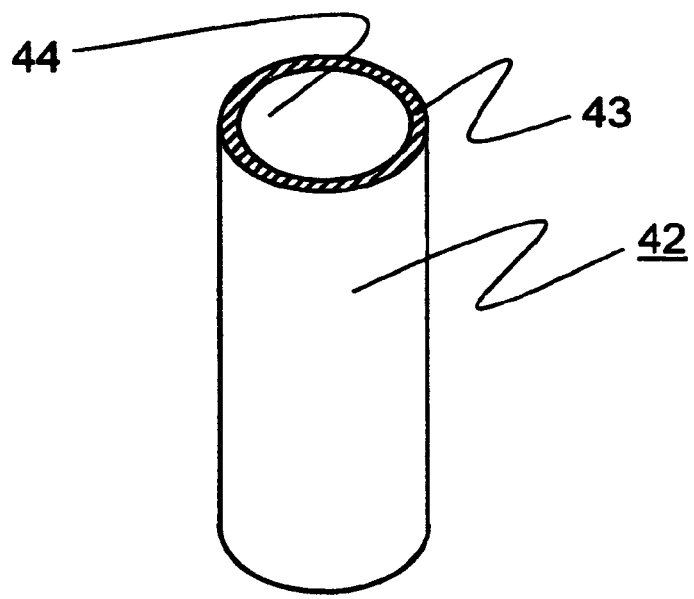
FIG. 7 is a perspective view of a pipe.

According to the invention, the duct 6 may be formed at least in partial regions by at least one pipe 42. FIG. 7 diagrammatically shows an example of a pipe 42 in a perspective view. The pipe 42 has a wall 43 which delimits an interior space 44. The wall 43 is preferably cohesively connected to, in particular encapsulated with, the basic body 2 (not shown therein).

Figure 8:
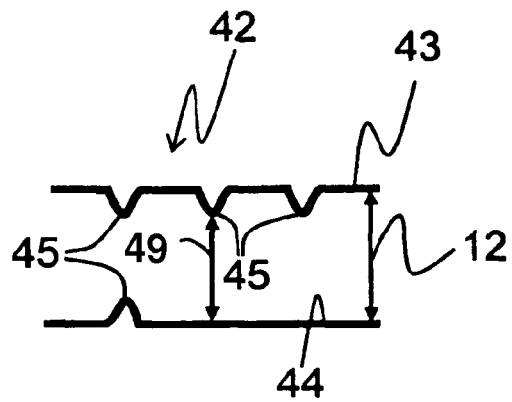
FIGS. 8 to 10 are fragmentary, longitudinal-sectional views of different refinements of a pipe.
Figure 9:
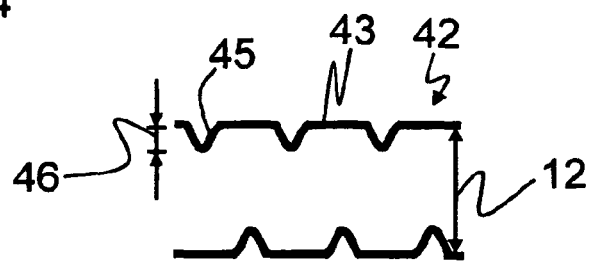
Figure 10:
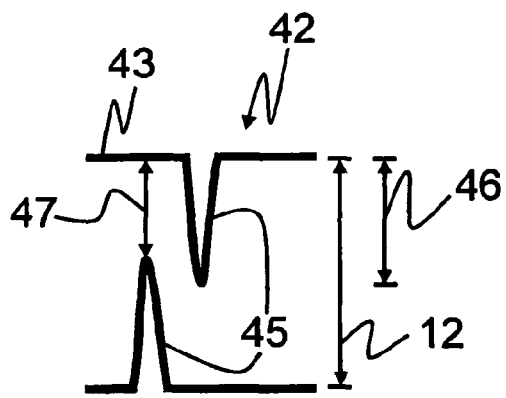

The at least one pipe 42 may have at least one projection 45 into the interior space 44 of the pipe 42, as diagrammatically shown in FIGS. 8 to 10. This forms a constriction 47 of the duct cross section 12. The constrictions 47 are illustrated as examples.

The at least one projection 45 may, in cross section, encircle the entire pipe 42 or may also be formed only in radial partial regions, and consequently in a partially circumferential manner. In the case of partially circumferential projections 45, the projections may each at least partially cover other circumferential regions, and may in particular be formed symmetrically oppositely—as shown in FIG. 8—or offset with respect to one another—as shown in FIGS. 9 and 10. In this case, a projection height 46 of the projections 45 may be uniform or variable. In particular, the projections 45 may be constructed in such a way that their projection height 46 is greater than half of a clear width 49 of the pipe 42 in that region, with the projections 45 being formed radially asymmetrically, preferably substantially on opposite sides and offset with respect to one another, as shown in FIG. 10. In the case of a round pipe 42, the clear width 49 corresponds to the pipe diameter. Embodiments of ducts 6 are fundamentally preferable which have a clear width 49 of 0.1 to 1 mm, preferably 0.2 to 0.5 mm.

In operation, the evaporator device 1 is supplied with a liquid to be evaporated. The projections 45 result in improved evaporation performance, since droplets of the evaporating fluid, which are driven through the duct 6 and/or through the pipe 42, for example due to a steam or vapor cushion between the droplet and the wall 43 of the duct 6, impinge on the at least one projection 45 and are at least partially evaporated as a result of the contact with the projection 45.

Figure 11:
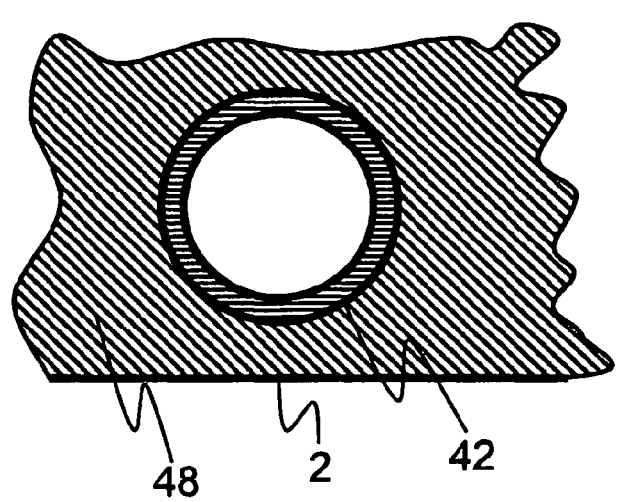
FIG. 11 is a cross-sectional view of an encapsulated pipe.

FIG. 11 shows a portion of the basic body 2. The basic body 2 includes a pipe 42 as a duct 6, which is encapsulated with a casting material 48. This results in a cohesive connection between the pipe 42 and the basic body 2, which also encompasses the non-illustrated heating elements 5. The cohesive connection results in a good transfer of heat from the heating elements 5 to the at least one pipe 42. It is preferable for the casting material 48 to be, or contain, aluminum.

The invention claimed is:

1. An evaporator device, comprising:
   a basic body with at least one inlet line and at least one outlet line;
   at least one duct disposed in said basic body connecting said inlet line to said outlet line and conducting a fluid through said at least one duct, said at least one duct having an evaporation section and a meandering course in said evaporation section;
   at least said evaporation section of said at least one duct at least partially including at least one pipe conducting the fluid through said at least one pipe; and
   at least one heating element disposed in said basic body in heat-conducting contact with said evaporation section.

2. The evaporator device according to claim 1, wherein said at least one pipe is cohesively connected to said basic body.

3. The evaporator device according to claim 1, wherein said at least one pipe is formed from a material including at least one of the following substances:
   a) steel;
   b) aluminum; or
   c) titanium.

4. The evaporator device according to claim 1, wherein said at least one duct has, in said evaporation section, at least one of the following features:
   5.1) a plurality of alternating straight shape regions and curved shape regions;
   5.2) curved shape regions having an extension of a duct cross section;
   5.3) a duct section length of 300 to 1,000 millimeters;
   5.4) a mean duct cross section of 0.2 to 10 square millimeters;
   5.5) differently curved shape regions;
   5.6) a plurality of curved shape regions with a curvature of at least 90°;
   5.7) a configuration in an evaporator plane of said basic body;
   5.8) a duct wall including aluminum;
   5.9) a duct wall including titanium;
   5.10) a duct wall having a mean roughness depth in a range of from 2 micrometers to 50 micrometers;
   5.11) a hydrolytically active duct wall; or
   5.12) shape regions with a constriction of a duct cross section.

5. The evaporator device according to claim 1, wherein said at least one duct forms an inflow section between said at least one inlet line and said evaporation section, said inflow section being offset relative to said evaporation section.

6. The evaporator device according to claim 5, wherein said at least one duct has, in said inflow section, at least one of the following features:
   7.1) a position offset relative to an evaporator plane of said basic body;
   7.2) a mean duct cross section of 0.2 to 30 square millimeters;
   7.3) a cooling device; or
   7.4) a galvanic deposition.

7. The evaporator device according to claim 1, wherein said at least one duct forms an outflow section between said evaporation section and said at least one outlet line, said outflow section including a widening of a duct cross section.

8. The evaporator device according to claim 7, wherein said at least one duct has, in said outflow section, at least one of the following features:
   9.1) at least one hydrolytically active reactor chamber;
   9.2) at least one honeycomb body having sheet-metal foils including aluminum forming a plurality of flow paths;
   9.3) a conical widening between said evaporation section and a hydrolytically active reactor chamber; or
   9.4) a thermal insulation insulating against said at least one heating element.

9. The evaporator device according to claim 1, wherein said basic body is formed with at least one of the following:
   10.1) aluminum material;
   10.2) a two-part construction with a central evaporator plane;
   10.3) a parting surface of said basic body formed by at least said evaporation section of said at least one duct;
   10.4) an inflow section of said at least one duct formed into only a first part of a two-part basic body; or
   10.5) a multiplicity of receptacles each receiving at least one respective heating element.

10. The evaporator device according to claim 1, which further comprises a pump, said at least one inlet line being connected to said pump and having an inflexible line cross section.

11. The evaporator device according to claim 1, which further comprises an exhaust-gas line, said at least one outlet line configured to be connected to said exhaust-gas line and having a perforated end region.

12. A motor vehicle, comprising:
   at least one evaporator device according to claim 1;
   a drive producing exhaust gases;
   at least one exhaust-gas line disposed downstream of said drive, said at least one outlet line of said evaporator device projecting into said at least one exhaust-gas line; and
   a reservoir and a fluid conveyor interacting with said at least one inlet line of said evaporator device.

13. A method for producing an evaporator device, the method comprising the following steps:
   providing a basic body having at least one inlet line and at least one outlet line;
   providing at least one heating element in the basic body;
   providing at least one duct in the basic body connecting the at least one inlet line to the at least one outlet line and conducting a fluid through the at least one duct;
   providing the at least one duct with an evaporation section in heat-conducting contact with the at least one heating element;
   forming at least a part of the evaporation section from at least one pipe and conducting the fluid through the at least one pipe, the at least one pipe composed of a material including at least one of the following substances:
   a) aluminum,
   b) titanium, or
   c) steel, and
   encapsulating the at least one pipe with a casting material.

14. The method according to claim 13, wherein the material from which the at least one pipe is formed has a higher melting point than the casting material.

15. The method according to claim 13, wherein the casting material includes aluminum.

16. The method according to claim 13, which further comprises carrying out the step of conducting the fluid through the pipe as the pipe is being encapsulated.

17. The method according to claim 16, wherein the fluid includes at least one of the following substances:
   A) air;
   B) an inert gas;
   C) oxygen;
   D) nitrogen; or
   E) a gas obtained from evaporation of a liquefied gas.

* * * * *